July 21, 1959  W. V. BARKWAY  2,895,611
CAN SEPARATING DEVICE
Filed July 12, 1956  3 Sheets-Sheet 2

INVENTOR.
Wesley V. Barkway
BY Bacon & Thomas
ATTORNEYS

July 21, 1959 W. V. BARKWAY 2,895,611
CAN SEPARATING DEVICE
Filed July 12, 1956 3 Sheets-Sheet 3

INVENTOR
Wesley V. Barkway
BY
Bacon & Thomas
ATTORNEYS

United States Patent Office 2,895,611
Patented July 21, 1959

2,895,611

CAN SEPARATING DEVICE

Wesley V. Barkway, Mason, Mich.

Application July 12, 1956, Serial No. 597,467

8 Claims. (Cl. 209—104)

The present invention relates to a device for separating cans and more particularly to a device for separating cans having bulged ends from those which are not bulged.

The device is adapted to several specific applications. For instance, it is well-known that in the process of canning, a number of cans are produced which are imperfectly sealed and give rise to leakage, spoilage or the production of harmful bacteria.

During the canning and processing of foods, the cans are subjected at a plurality of stations to varying conditions of temperatures and pressure. A can may have its ends bulged at one station and flat at another but in every instance when a hermetically sealed can is bulged, an imperfectly sealed can, known as a "leaker," will be flat, and vice versa. Attempts have been made in the past to separate leaking cans by the presence or absence of bulges, but due to the fact that these bulges are in most cases very slight, often defying visual inspection, no automatic means have yet been devised which will effect the separation efficiently.

Also, as is well known, in imperfectly sealed cans bacterial contamination can occur long after the canning operation, due to incomplete sterilization. In such cases gases develop which cause the ends of the contaminated cans to bulge, and therefore the present device can be used entirely separate from a canning operation to separate cans having sterile contents from those which have become bacterially contaminated.

Accordingly, it is a primary object of the present invention to provide a device which will automatically detect cans having bulged ends and separate them from those cans whose ends are unbulged.

It is another object of the invention to provide a device which will automatically detect and reject imperfectly sealed cans as they emerge from a station in the canning assembly line at which they have been either heated or cooled.

Another object of the invention is to provide a device which will efficiently separate cans having bulged ends due to bacterial contamination of their contents from those in which the contents are in a sterile condition.

Another object of the invention is to provide a device of the type described which is light in weight and compact in size and one which may be readily installed with conventional canning apparatus.

Another object of the invention is to provide a device of the type described which does not involve the use and maintenance of complex and delicate equipment, as is the case with many conventional testing devices.

Another object of the present invention is to provide a device of the type described which requires no operator and does not involve continuous inspection.

Another object of the present invention is to provide a device of the type described which is completely efficient in operation, even detecting imperfections which would not be apparent upon visual inspection.

A further object of the present invention is to provide a device of the type described which will readily accommodate cans being delivered at rates of up to 300 cans per minute or more, and which is not affected by fluctuations in the rate of can delivery.

A further object of the present invention is to provide a device of the type described which with slight modification can be adapted for installation at more than one station along the path of a conventional canning assembly line.

A still further object of the present invention is to provide a device of the type described which is extremely simple in design and economical to manufacture and use, the various elements all being of a durable nature and the device as a whole being readily adjustable to account for what little wear might occur.

Other objects and advantages will be apparent from the following specification taken in connection with the accompanying drawings in which:

Fig. 4 is a cross-sectional view taken along the lines 4—4 of Fig. 1;

Fig. 5 is a cross-sectional view taken along the lines 5—5 of Fig. 4; and

Figure 1:
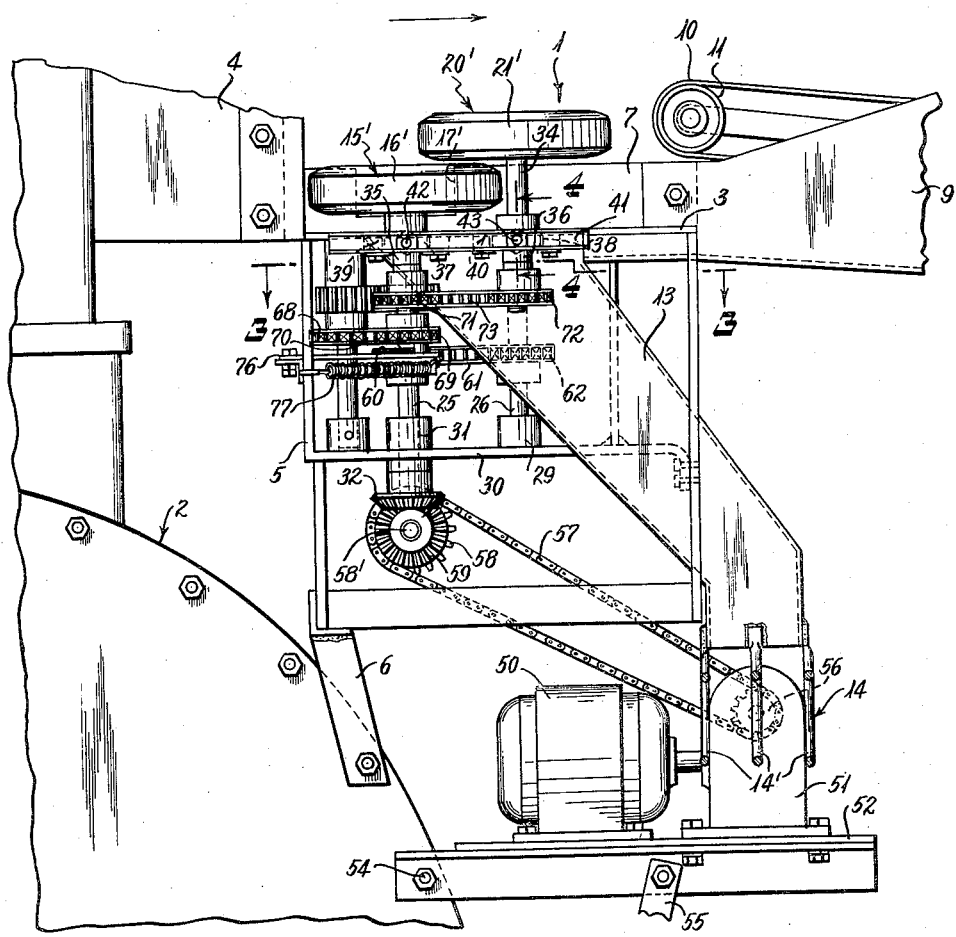
Fig. 1 is a side elevational view of the invention, showing the device installed in a conventional canning apparatus.
Figure 2:
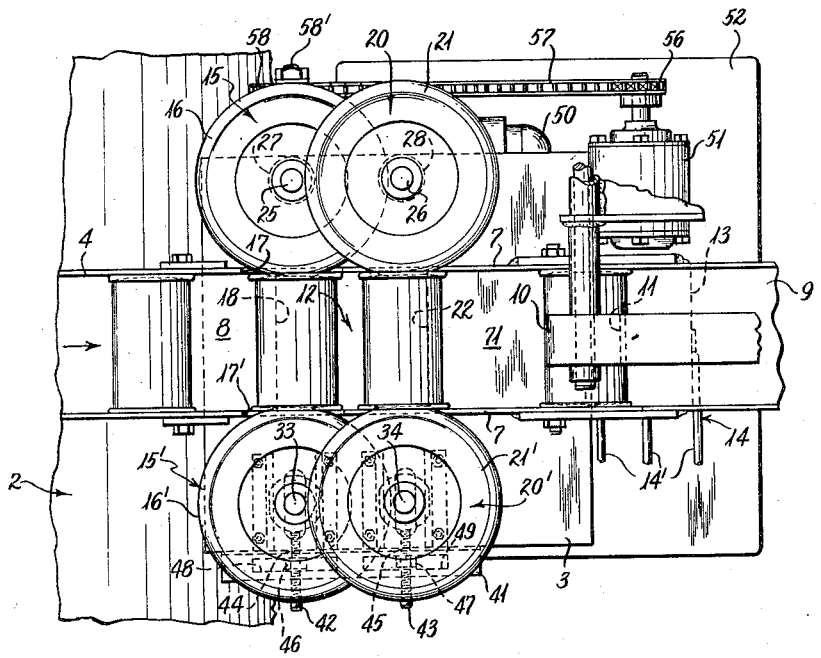
Fig. 2 is a top plan view of the invention.
Figure 3:
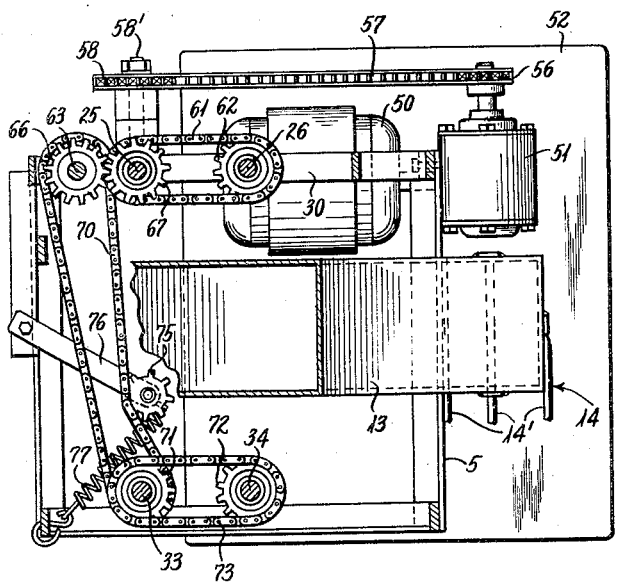
Fig. 3 is a sectional view of the invention taken along the line 3—3 of Fig. 1.

Referring now in detail to the drawings, the can separator indicated in general by the numeral 1, is shown for purposes of illustration installed in a conventional canning assembly line between an atmospheric or open-type preheater 2 and a cooker or sterilizer (not shown). The separator 1 includes a platform 3 mounted at the discharge 4 of preheater 2. The platform 3 is supported on a frame 5 which, in turn, may be mounted on the preheater 2 by means of a pair of mounting brackets 6 or the like.

A pair of spaced parallel side rails 7 are secured on the upper surface of the platform 3, extending thereacross to define a trackway 8 between preheater discharge 4 and an inclined chute 9 at the opposite end of platform 2. The side rails 7 are preferably of a height somewhat less than the diameter of the cans being processed and the trackway 8 is of a width slightly exceeding the axial length of said cans. Chute 9 serves as a feedway for the cooker or sterilizer and may be provided with a driven endless conveyor 10 mounted overhead on rollers 11 for the rapid transmission of cans therealong.

An opening 12 is provided in the trackway 8 for the reception of rejected cans and leads to a reject chute 13. A guide 14 formed of rigid wires 14' may be provided at the lower end of chute 13 for the horizontal discharge of the rejected cans or to effect the discharge in any other manner suitable for removal or storage.

In a common horizontal plane above the platform 3 a pair of wheels 15 and 15' are mounted, one on either side of the trackway 8. The wheels 15 and 15' are provided with semi-pneumatic tires 16 and 16' which extend through cut-away portions 17 and 17' of the side rails 7 and overlap the trackway 8 at points adjacent the forward edge 18 of opening 12.

Wheels 15 and 15' are spaced apart a distance slightly less than the gross axial length of the cans being processed (i.e., the axial length including the extent of seam projection at either end) but the aforesaid distance should be slightly greater than a net axial length not including this extent of seam projection and also not including any factor of bulging which might occur at those ends, as will appear hereinafter. It is further desirable that the wheels 15 and 15' be positioned at such a height that they generally bisect the ends of cans passing therebetween, the outer peripheries of the tires 16 and 16' confronting said ends in a central zone comprising less than one-half the area thereof. The importance of the dimensions and relationships cited above will be evident from a description of the operation of the device, which will appear hereinafter.

A similar pair of wheels 20 and 20' are provided with tires 21 and 21' and are positioned in a common horizontal plane above the platform 3, one on either side of trackway 8. The spacing between wheels 20 and 20' is the same as that between wheels 15 and 15', but wheels 20 and 20' overlie the top of side rails 7 at points adjacent the rear edge 22 of opening 12 and are at a sufficient height to confront the upper seam edges of cans passing therebetween. Wheels 20 and 20' are in close proximity to wheels 15 and 15', the respective axes of the two sets of wheels being spaced longitudinally of the trackway by a distance almost equal to the radius of the wheels.

Wheels 15 and 20 are mounted on shafts 25 and 26, respectively, which are journaled in the platform 3 in bearings 27 and 28. The lower end of shaft 26 is mounted in a bearing 29 secured to a horizontal member 30 of frame 5. Shaft 25 is journaled in a bearing 31 on the member 30 and extends downwardly therefrom terminating in a beveled gear 32.

Wheels 15' and 20' are mounted on shafts 33 and 34, respectively, which are journaled intermediate their ends in bearings 35 and 36. The bearings 35 and 36 in turn, have flanges 37 and 38, respectively, which are received in guideways 39 and 40 for sliding movement in a direction perpendicular to the trackway 8. An outer rail 41 formed of channel iron or the like is mounted on one side of platform 3 adjacent the guideways 39 and 40. Threaded bolts 42 and 43 are secured to bearings 35 and 36, respectively, by welding or any other suitable means, and extend laterally through apertures 44 and 45 in outer rail 41. Adjusting nuts 46 and 47 are mounted on bolts 42 and 43, respectively, extending through slots 48 and 49 in the upper leg of channel iron rail 41 and through slots 48' and 49' in the lower leg. Thus, upon rotation nuts 46 and 47 serve to move the respective bearing assemblies along guideways 39 and 40, and in this way the wheels 15' and 20' can be accurately spaced from wheels 15 and 20, respectively, and adjustments can be made from time to time for what little wear might occur in the tires 16, 16', 21 and 21'. Shafts 33 and 34 extend downwardly from platform 3 a sufficient distance to accommodate certain gears and sprockets which will be described hereinafter.

A motor 50 and gear reduction box 51 are mounted on a lower platform 52 secured to the preheater 2 by means of bolts 54 and a pair of mounting brackets 55. Drive from the gear reduction box is transmitted through a sprocket 56 and chain 57 to a sprocket 58 which is mounted on a shaft 58' journaled in the frame 5 by any suitable means (not shown). The shaft 58' also carries a beveled gear 59 which meshes with gear 32 and serves to rotate shaft 25 and wheel 15. Rotary motion is imparted to the shaft 26 and wheel 20 through a chain-and-sprocket drive including a sprocket 60 on shaft 25, a chain 61, and a sprocket 62 on shaft 26.

A shaft 63 is mounted adjacent the shaft 25, in opposed bearings 64, in the platform 5, and 65, in horizontal frame member 30, and carries a gear 66 which meshes with a gear 67 on the shaft 25 to effect a reverse rotation of the shaft 63. This reverse rotation is transmitted to the shaft 33 through the agency of a sprocket 68 on shaft 63, a sprocket 69 on shaft 33, and a cross-over chain 70 connected therebetween, thus effecting a rotation of the wheel 15' in a direction opposite to that of the rotation of wheel 15. Another sprocket 71 on shaft 33 is connected with a sprocket 72 on the shaft 34 by a chain 73 to effect a corresponding rotation of the wheel 20'.

Due to the fact that shafts 33 and 34 are adjustable, it has been found useful to employ an idler sprocket 75, pivotally mounted by a bracket 76 on the frame 5 and spring-loaded with a spring 77, to take up any slack in the cross-over chain 70. In this manner, any slack occurring when the wheel 15' is originally set, or when any subsequent adjustment is made for wear, can be accommodated.

If desired, the motor 50 may be dispensed with as a source of power and the drive means may be derived from the driven conveyor 10.

Figure 6:
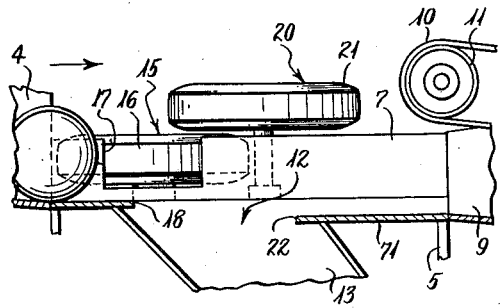
Figs. 6, 7, 8 and 9 are sectional views, of a diagrammatic nature, showing the course of travel of a non-leaking can through the device.
Figure 7:
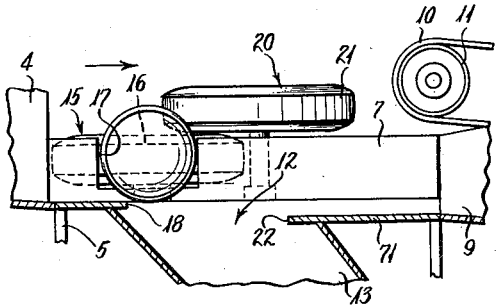
Figure 8:
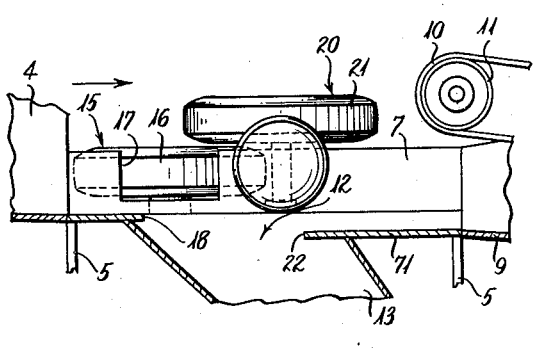
Figure 9:
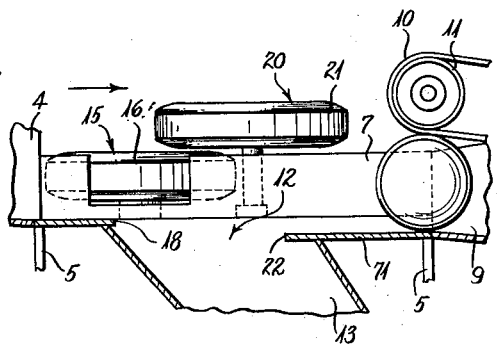

The operation of the described device is based upon the fact that when conventional cans being processed are heated in a preheater their ends normally become bulged, the bulging in most cases being of such small extent that it does not extend past the projection of the double seams at the can ends. Alternatively, any small leak or the like in a particular can precludes any such bulging and results in a can having flat ends as in the case of an unheated can. Accordingly, in the present device when a particular can is delivered from the preheater discharge 4 and rolls along the trackway 8, its leading seam edges are gripped between the resilient tires 16 and 16' of driven wheels 15 and 15', and the can is thus conveyed from the position shown in Fig. 6 to the position shown in Fig. 7. At this point if the can ends are bulged, which signifies an absence of any leakage, the tires 16 and 16', extending slightly inwardly of the outer edges of the respective seams, grip the bulging ends proper and convey the can on until the upper seam edge of the can is gripped between tires 21 and 21' which carry the can forward as in Fig. 8 to the rear portion 71 of the trackway 8, beyond the opening 12, for delivery to the chute 9. It is desirable that the rear portion 71 be slightly lower than the rest of trackway 8 to accommodate any slight lowering of the can due to slippage which might occur in the various gripping actions.

When an imperfect can having unbulged ends is delivered to the detector 1, its leading edges are gripped between tires 16 and 16' but as soon as these edges pass through said tires, the can drops to a level at which its upper seam edges are too low to be gripped by the tires 21 and 21'. Thus, when the can is released from tires 16 and 16' it drops into the reject chute 13.

The present device with little modification can be installed at the cooler outlet. At this position cans having leaks will emerge with bulged ends, whereas the ends of airtight cans will have resumed their normal flat condition. It is therefore a simple matter to modify the invention so that imperfect cans carried past the opening 12 will be rejected while good cans, dropping through the opening 12, are conveyed forward along the assembly line.

It will be understood that numerous other changes may be made in the construction and operation described herein without departing from the spirit of the invention or the scope of the annexed claims.

I claim:

1. A can separating device, comprising: a stationary trackway including a surface for supporting rolling cans being guided along said trackway, said supporting surface having an opening therein wherethrough said cans would ordinarily drop by gravity; and means adjacent said opening for detecting the presence of cans having slightly bulged ends and for conveying said cans over said opening while permitting cans having unbulged ends to drip through said opening, said means including a pair of opposed horizontal wheels mounted on substantially vertical axles at opposite sides of said supporting surface and slightly overlying opposed portions of the opposite side edges of said supporting surface in the vicinity of said opening, said wheels being so spaced as to be adapted to grip bulge-ended cans at the bulged ends thereof between opposed portions of the outer peripheries of said wheels but not being closely enough spaced to grip unbulged can ends, and said wheels being driven to convey said bulge-ended cans along said trackway over said opening.

2. The device of claim 1 wherein said wheels include resilient outer peripheries, said resilient outer peripheries being adapted to be depressed to receive the seam-edge projection of a can being gripped therebetween.

3. A can separating device, comprising: a stationary trackway including a surface for supporting rolling cans being guided along said trackway, said supporting surface having an opening therein; a pair of opposed horizontal wheels mounted on substantially vertical axles at opposite sides of said trackway and slightly overlying opposed portions of the opposite side edges of said trackway in the vicinity of said opening, one of said wheels being slidably mounted for adjustment in a direction perpendicular to said trackway, whereby said wheels may be so spaced as to grip bulge-ended cans at the bulged ends thereof between opposed portions of the outer peripheries of said wheels but not being closely enough spaced to grip unbulged can ends, said wheels being driven to convey said bulge-ended cans along said trackway over said opening.

4. A can separating device comprising: a trackway for the reception of rolling cans, said trackway having an opening therein; a first pair of opposed wheels situated on opposite sides of said trackway and overlying portions of the edges of said trackway in the vicinity of the forward edge of said opening; and a second pair of opposed wheels situated on opposite sides of said trackway and overlying portions of said trackway in the vicinity of the rear edge of said opening, said first pair of wheels being adapted to grip said cans therebetween and to convey only cans having bulged ends along the trackway to said second pair of wheels, and said second pair of wheels being adapted to grip said bulge-ended cans at the upper edges thereof and being driven to convey said bulge-ended cans along said trackway past said opening.

5. The device of claim 4 wherein at least said first set of wheels are provided with resilient outer peripheries.

6. The device of claim 4 wherein at least one wheel in each pair of wheels is adjustable in a direction perpendicular to said trackway, whereby the desired spacing between the wheels of each pair may be maintained.

7. A can separating device, comprising: a stationary trackway including a surface for supporting rolling cans being guided along said trackway, said supporting surface having an opening therein; means adjacent the forward edge of said opening to convey bulge-ended cans along a straight rectilinear path over said opening, said means conveying cans not having bulged ends in lowered path; and a pair of opposed horizontal wheels mounted on substantially vertical axles at opposite sides of said trackway and overlying said trackway at points adjacent the rear edge of said opening, said pair of wheels being adapted to grip the upper edges of said bulge-ended cans and to convey said bulge-ended cans past said opening, while said cans not having bulged ends drop into said opening.

8. A can separating device comprising: a stationary trackway including a surface for supporting rolling cans being guided along said trackway, said supporting surface having a can receiving opening therein; a first pair of opposed horizontal wheels mounted on substantially vertical axles at opposite sides of said trackway and overlying opposed portions of opposite edges of said trackway in the vicinity of the forward edge of said opening, said wheels being spaced apart a distance slightly less than the gross axial length of said cans; and a second pair of similarly spaced opposed horizontal wheels mounted on substantially vertical axles at opposite sides of said trackway at a higher level than said first pair of wheels and overlying opposed portions of opposite edges of said trackway in the vicinity of the rear edge of said opening, the respective wheels of said second pair being in partially overlying relation with respect to the respective wheels of said first pair.

References Cited in the file of this patent

UNITED STATES PATENTS

| | | |
|---|---|---|
| 520,440 | Maull | May 29, 1894 |
| 1,492,867 | Thompson | May 6, 1924 |
| 1,641,777 | Newhouse | Sept. 6, 1927 |
| 2,321,320 | Reynolds | June 8, 1943 |
| 2,339,638 | Henszey et al. | Jan. 18, 1944 |
| 2,364,187 | Birdsall | Dec. 5, 1944 |